United States Patent [19]

Kuwana et al.

[11] Patent Number: 4,541,905
[45] Date of Patent: Sep. 17, 1985

[54] ELECTRODES FOR USE IN ELECTROCATALYTIC PROCESSES

[75] Inventors: Theodore Kuwana, Worthington; Wen-Hong Kao, Columbus, both of Ohio

[73] Assignee: The Ohio State University Research Foundation, Columbus, Ohio

[21] Appl. No.: 560,832

[22] Filed: Dec. 13, 1983

[51] Int. Cl.[4] ............................................... C25D 5/00
[52] U.S. Cl. ..................................... 204/38.7; 204/47; 204/290 R
[58] Field of Search ............... 204/290 R, 38 R, 38 E, 204/47, 14.1, 129, 38.1, 38.7

[56] References Cited

U.S. PATENT DOCUMENTS

| 4,414,080 | 11/1983 | Williams | 204/290 R |
| 4,439,302 | 3/1984 | Wrighton | 204/290 R |
| 4,459,324 | 7/1984 | Ganger | 204/290 R |

Primary Examiner—John F. Niebling
Attorney, Agent, or Firm—Sidney W. Millard

[57] ABSTRACT

Electrodes having high electrocatalytic activity are prepared by coating a base member of conductive material (preferably glassy carbon) with a layer of a porous polymeric material and then electrodepositing microparticles of metal within the polymeric layer by electrolysis using the electrode in a solution of the appropriate metal. The metal particles deposited within the polymer layer are typically less than about 100 nm. in diameter and their imbedding within the polymeric layer helps prevent poisoning of catalytically active metal by absorbed macromolecules.

13 Claims, 4 Drawing Figures

ELECTRODES FOR USE IN ELECTROCATALYTIC PROCESSES

The U.S. Government has certain rights in this invention pursuant to grant No. AFOSR-78-3672 from the Air Force Office of Scientific Research.

BACKGROUND OF THE INVENTION

This invention relates to electrodes for use in electrocatalytic processes. More particularly, the invention relates to electrodes containing metal in a dispersed form, and to methods for the preparation and use of such electrodes.

It is known that electrodes having high catalytic activity in electrocatalytic reactions can be prepared by depositing a film of a polymer on a conductive base member (the term "conductive" and other terms of similar import are used herein to refer solely to electrical properties) and incorporating organometallic compounds into the polymer films; see:

Doblhofer et al., *J. Electrochem. Soc.*, 127, 1041(1970);
Doblhofer et al., *Ber. Bunsenges, Phys. Chem.*, 82, 403(1978);
Ikada et al., *J. Am. Chem. Soc.*, 104, 2683(1982); and
Bettlheim et al., *J. Electroanal. Chem.* 110, 93(1980).

It is also known to spray microcrystalline particles of platinum on the outer surface of a polymer layer covering an electrode; see:

Kiwi Stabilization of Platinum Particles by Polymers in Aqueous Solutions, pp. 246 et seq, in Tadros (ed.), The Effect of Polymers on Dispersion Properties, Academic Press, London (1980).

Attempts have been made to produce somewhat similar electrodes having elemental metal dispersed in the polymer form. For example, elemental platinum has been incorporated into a polymer film of [N,N'-bis(3-(trimethoxysilyl)propyl-4,4'-bipyridinium] dibromine covalently attached to a p-type silicon photocathode surface, to produce an electrode useful for photoelectrochemical hydrogen reduction; see:

Bookbinder et al., *Proc. Natl. Acad. Sci. USA*, 77, 6280(1980);
Bookbinder et al., *J. Am. Chem. Soc.*, 103, 7656(1981);
Bruce et al., *J. Phys. Chem.*, 86, 1552(1982); and
Dominey et al., *J. Am. Chem. Soc.*, 104, 467(1982).

Although the first and third of these papers report electrochemical and other studies suggesting that the elemental platinum is present as discrete particles, scanning electron microscopy studies reported in the same paper fail to show the presence of discrete particles of the metal in the polymer film. Accordingly, it appears that the electrodes thus prepared contain the metal in the form of separate atoms or very small assemblies of atoms rather than observable discrete particles in the polymer film. Preparing such electrodes having the metal in the form of discrete particles within the polymer film would be desirable in order that a large surface area of metal may be available for catalytic purposes and because such dispersed metal particles would be expected to have better catalytic properties than the prior art electrodes discussed above.

It has now been found that it is possible to prepare electrodes having discrete particles of metals or metal oxides dispersed within a polymer layer and that such electrodes have highly desirable electrocatalytic properties.

SUMMARY OF THE INVENTION

This invention provides an electrode comprising a base member formed of conductive material, a layer of porous polymeric material covering at least part of the surface of the base member and a number of discrete particles of a metal or metal oxide dispersed in the polymer layer.

This invention also provides a method for producing such an electrode by immersing the conductive base member having the layer of porous polymeric material thereon in a solution of a metal compound capable of being electrolyzed to deposit the metal, and passing electric current through the base member and the solution, thereby causing electrolysis of the metal salt and deposition of a number of discrete particles of the metal dispersed in the polymer layer.

Finally, this invention provides a method of carrying out a redox reaction electrochemically using the instant electrode.

DETAILED DESCRIPTION OF THE INVENTION

Figure 1:
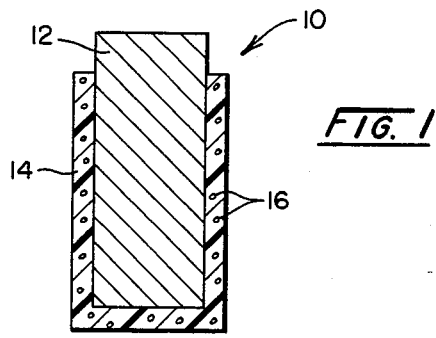
FIG. 1 is a schematic cross-section through an electrode of the invention.

As shown in FIG. 1, an instant electrode (generally designated 10) comprises a base material 12 formed of conductive material. (The term "conductive material" is used herein to include any material which has sufficient electrical conductivity to function as an electrode, and thus includes materials such as silicon which are normally denominated semi-conductive.) The major part of the surface of the base member 12 is covered with a layer 14 of porous, polymeric material. Those skilled in the art will be aware of various types of porous polymers such as polyvinylacetic acid, and will also be aware of non-porous types of polymer such as, for example, polystyrene which do not appear to be useful in the instant electrode. Within the layer 14 are dispersed a large number of discrete particles 16 of metal or metal oxide; it should be noted that the particles 16 are dispersed through the layer 14, rather than being present only at the outer surface of this layer, and that the particles 16 are in the form of discrete particles, not a continuous film of metal as in some types of prior art electrodes. It is believed (although the invention is in no way limited by this belief) that the dispersion of the metal in the form of the small particles 16 through the layer 14 and the resultant large exposed surface of metal contributes to the high catalytic activity of the instant electrode. The form of electrode 10 shown in FIG. 1 is intended to be used with only the polymer-covered part of the base member 12 immersed in the solution to be treated, the upper part (in FIG. 1) of the base member 12 projecting above the solution and having a conductor attached thereto. Obviously, if it is desired to construct an instant electrode which is totally immersed during use, the polymer layer 14 should preferably cover the whole external surface of the electrode.

The conductive material of which the base member of the instant electrode is formed should desirably be one to which the polymeric material will adhere strongly, in order to provide an electrode which is robust and in which there is no tendency for the polymeric layer to strip from the base member during use. A preferred conductive material for use in the base member is glassy carbon. This material, which is made by pyrolysis of carbon-containing polymers, is readily available commercially, for example, from Tokai Carbon Company, Tokyo, Japan and Atomergic Chemetals Corporation, New York, N.Y.

Although other types of porous polymers, for example polymethacroyl chloride, polyvinylpyridine and other vinyl-based polymers, can be used in the instant electrode, the preferred polymer is polyvinylacetic acid. Films of this material can readily be formed on base members by various techniques discussed in more detail below, and the films adhere well to the underlying base member. Polyvinylacetic acid films also do not degrade rapidly in use, although some ruptures in the film can be observed by scanning electron microscopy after extensive use of such an electrode for hydrogen generation. A polymer thickness of about 40–100 nm. has been found to give good results.

It should be noted that, at least in most variants of the instant electrodes, the role of the polymer is very different from the prior art electrodes described in the aforementioned papers by Bookbinder et al, *Proc. Natl. Acad. Sci. USA*, 77, 6280 (1980) and Bruce et al., *J. Phys. Chem.*, 86, 1552 (1982). These prior art electrodes employ as the polymer [N,N′-bis(3-tri-methoxysilyl)-propyl)-4,4′-bipyridinium] dibromide, an unusual polymer which itself acts as a reducing agent. Indeed, as shown in these papers, electrodes comprising a silicon base coated with this polymer but without any inclusion of metal in the polymer are active for photoelectrochemical generation of hydrogen from water. Although it is not clear from these papers what is the exact nature of the interaction between the metal in the metal-containing electrodes and the reducing polymer matrix containing the metal, these papers would appear to imply that the metal merely serves to assist the inherent photoelectrochemical action of the polymer itself. In contrast, although we do not absolutely exclude the possibility that such reducing polymers may be used in the instant electrodes, it is not necessary that the polymer used in the instant electrodes possess any specific reducing or oxidizing properties and indeed the preferred polymers (for example polyvinylacetic acid) used in the instant electrodes do not possess any redox activity. Thus, in contrast to the aforementioned prior art electrodes, in the instant electrodes the polymer appears to function as an inert matrix for retaining the metal particles, these particles being the only electrochemically active part of the electrode.

Although the polymer used in the instant electrodes need not have any specific redox properties it must be porous. The term "porous" is used herein to mean a polymer which permits molecules of solvent and of the reactants and products of the electrochemical reaction to be carried out at the electrode to pass through the polymer. Although a polymer may thus be porous for purposes of one electrochemical reaction involving relatively small molecules but insufficiently porous for a different electrochemical reaction involving much larger molecules, it is believed that those skilled in the art will readily be able to select an appropriate polymer for use in any particular electrochemical reaction by routine tests. Since the pore size of many polymers varies with the degree of cross-linking, when seeking to produce an instant electrode for use in a reaction involving large molecules, it may be desirable to use a polymer having a relatively low degree of cross-linking.

A wide variety of metals and metal oxides can be used in the instant electrodes. For example, the metal may be platinum, palladium, silver, nickel or cadmium. Metal alloys may also be employed, as may mixtures of metal oxides. Naturally, the choice of metal or metal oxide to be employed will be determined largely by the intended use of the electrode.

Empirically, it has been found that the catalytic properties of the instant electrode are affected both by the amount of metal or metal oxide dispersed in the polymer layer and the size of the discrete metal particles. Desirably, the (arithmetic) average diameter of the metal or metal oxide particles is from 5–300, and preferably 20–100, nm. It has been found that good results are obtained with electrodes in which the weight of the metal in the dispersed particles is in the range of 1–50 micrograms cm.$^{-2}$ of the surface of the base member covered by the layer and having $10^6$ to $10^8$, and preferably $10^7$ to $10^8$ particles m.$^{-2}$ of the surface of the base member covered by the polymer layer.

As noted above, in the instant electrode the metal or metal oxide particles are dispersed through the polymer layer rather than merely being present on the outer surface of the polymer layer. The dispersion of the particles within the polymer layer may be seen from scanning electron micrographs of instant electrodes, in which the brightness of the particle images varies considerably within any given micrograph, this brightness variation being independent of particle size. The brighter images are believed to be particles nearer the outer surface of the polymer layer, where poor electrical contact with the base member may promote charging of the particles and the resultant electron signal is not attenuated by the polymer film. At low loading levels, (i.e. when the amount of metal per unit area of the polymer film is low) a few large particles, which are always brighter than the other particles, are observed and these large particles are believed to be due to preferential growth of metal nuclei at or near the outer surface of the polymer layer; excessive development of such large particles at the outer surface of the polymer layer is of course disadvantageous since they may be less active and have lower mechanical stability.

The chemical nature of the particles in the instant electrodes has been confirmed using a multichannel energy dispersive X-ray analyzer in conjunction with a scanning electron microscope and with a scanning Auger microprobe; the latter method permits a resolution of about 0.5–1 nm. At least in the case of electrodes in which the particles are platinum metal, scanning Auger microprobe analysis of "clean areas" where metal particles were not observable by scanning electron microscopy results in a finite platinum signal on the Auger microprobe. It is uncertain whether such signals from the clean areas are caused by small amounts of trapped hexachloroplatinate (the material used to deposit the platinum metal) in the polymer film or from platinum particles too small to be observable by scanning electron microscopy. Also, when the platinum particles in such electrodes are examined by scanning electron microscopy at magnification of 50,000–100,000×, although the platinum particles are still basically spherical the outer edges of the spheres appear to have angular structures, suggesting that the particles may be polycrystalline particles or coalesced particle clusters. It appears reasonable to assume that this surface roughness will increase as the particle diameter increases up to some critical value, after which the roughness factor will remain essentially constant. This is consistent with the variation of $I_o$ with metal loading discussed below.

Furthermore, multichannel X-ray analysis of an instant electrode containing a palladium platinum alloy confirms that each particle is composed of the bimetallic alloy, no separation of the two metals into different particles being observed. The metal particles in the instant electrodes are also resistant to degradation during electrolysis. For example, an electrode having a glassy carbon base member, a polyvinyl acetic acid polymer layer and platinum metal particles was used as a cathode for hydrogen generation in electrolysis of an aqueous sulfuric acid solution at ambient temperature. The current density average 20 mA/cm.$^2$ for more than 400 hours, the $I_o$ being constant within experimental error over this period. Scanning electron microscopy of the mean geometric diameter of the platinum particles before and after the electrolysis indicated no change in this average diameter. Thus there was no particle degradation due to sintering and recrystalization such as that observed in platinum fuel cell cathodes operating at higher temperatures; see Stonehart, *Electrochim. Acta.*, 17, 2333(1972) and Kunz, *Proc. Electrochem. Soc.*, 77, 607(1977). Thus, at ambient temperature the entrainment of the metal particles in the polymer layer apparently prevents particle aggregation, and this is of course desirable since such aggregation may effect the catalytic properties of the electrode by reducing the surface area of the dispersed metal.

In addition, it appears that the metal particles are less subject to contamination during prolonged electrolysis presumably because the particles are embedded in the polymer layer, which, although porous to the molecules of solvents and reactants involved, is not porous to the much larger particles of contaminants.

The properties of the metal particles dispersed in the polymer layer of the instant electrodes are normally very different from those of similar particles deposited directly upon the underlying base member. For example, as discussed above, the presently preferred variant of the instant electrode comprises a glassy carbon base member with a polyvinylacetic acid polymer layer. When electrodes of this type containing dispersed platinum, palladium, silver or nickel are subjected to ultrasonic cleaning for periods up to 15 minutes, no detectable removal of metal particles from the polymer layer occurs. In contrast, when the same four metals are electrochemically deposited on bare glassy carbon electrodes, ultrasonic cleaning rapidly removes the metal; in the case of platinum and nickel, at least the majority of the metal can be removed ultrasonically in less than one minute, while in the case of all four metals 15 minute ultrasonic cleaning results in substantially complete removal of the metal—see, for example, Evans et al., *Anal. Chem.*, 51, 348(1979) and Zak et al., *J. Am. Chem. Soc.*, 104, 5514(1982). In at least some cases, the pattern of metal deposition on the bare glassy carbon is also very different from that in the instant electrodes. For example, when nickel is electrodeposited on bare glassy carbon it tends to deposit along surface defects, such as scratches and holes, rather than to form substantially spherical microparticles evenly dispersed across the surface, as is the case in the instant electrodes. The enhanced mechanical stability of the metal against ultrasonic cleaning is probably due to the physical entrapment of the particles in the polymer layer, which is itself strongly adherent to the glassy carbon surface, although adsorption or adherence of the metal particles to the carboxylate groups of the polyvinyl acetic acid cannot be excluded; see, for example, Gileadi (ed.), *Electrosorption*, Plenum Press, New York, N.Y. (1967); Burksdand, *J. Vac. Sci. Technol.*, 15, 223 (1978); and Chapter 20 in "Photon, Electron and Ion Probes of Polymer Structure and Properties" Dwight et al. (eds.), ACS Symposium Series 162, Am. Chemical Society, Washington DC (1981); and Hall et al., *J. Appl. Polm. Sci.*, 13, 2085(1969).

The instant electrodes can be prepared by first forming the polymer layer upon the base member and then immersing the polymer-covered base member in a solution of a salt of the appropriate metal and depositing metal in the polymer layer by electrolysis. Several methods are known for the deposition of polymer layers upon electrodes; for example, it is known that deposition of polyvinylacetic acid layers on glassy carbon electrodes may be effected by mechanical abrasion; see Nowak, *J. Electroanal. Chem.*, 94, 219(1978), although this method is not recommended for use in the instant process since it tends to produce only monolayers of the polymer which are insufficiently thick for present purposes. Alternatively, it is known that thicker films of polyvinylacetic acid can be deposited upon glassy carbon by plasma polymerization. It has now been found that polyvinylacetic acid can be deposited upon base members, including glassy carbon, by immersing the base member in a refluxing solution of vinylacetic acid monomer (3-butenoic acid), and this is the preferred technique for producing the preferred glassy carbon-polyvinylacetic acid electrodes of the invention. The specific method presently preferred for forming such glassy carbon/polyvinylacetic acid electrodes involves first polishing the bare glassy carbon electrode with alumina (conveniently Buehler alpha-alumina, 1.0, 0.3 and 0.05 micron sizes) to a mirror-like finish followed by ultrasonic cleaning with distilled water to remove residual alumina, this cleaning being carried out as described in Evans et al., *Anal. Chem.*, 51, 348(1979); and Zak et al., *J. Am. Chem. Soc.*, 104, 5514(1982). After washing with distilled water and drying in an oven, the electrode is immersed in neat vinylacetic acid monomer refluxing at about 165° C. under nitrogen for at least 16 hours; the polymerization is believed to be initiated by radical generation on the surface of the electrode. The electrode is then washed with acetone in a Soxhlet extractor for approximately 24 hours to remove unreacted monomer. If desired, the integrity of the polymeric film may be checked by scanning electron microscopy.

Obviously, the metal compound used to prepare the instant electrodes must be one which is capable of being electrolyzed to deposit the metal. Since the metals used in the instant electrodes have all previously been deposited by electrolysis, and since in general the metal salt solutions used in preparing the instant electrodes are the same as those which are normally used for depositing film of the same metals on other electrodes, it is believed that those skilled in the art will have no difficulty selecting an appropriate metal salt solution for preparing any particular instant electrode. Appropriate metal salt solutions for depositing platinum, palladium, silver, nickel and cadmium, the preferred metals for use in the instant electrodes are described in detail in the Examples below. The size and number of metal particles produced in the polymer layer varies with the concentration of the metal salt in the solution; when electrolysis is effected by cyclic voltammetry or double potential step electrolysis (as discussed in more detail below), the particle density increases with increasing salt concentrations. As illustrated in the Examples below, solutions approximately 0.2–1 mM in metal generally give good results.

Desirably, the electrolysis step used in preparing the instant electrodes is conducted using a cyclically varying potential. Good results have been obtained using either cyclic voltammetry or double potential step electrolysis. The use of single potential step electrolysis is not recommended since it tends to produce larger metal particles with a greater sized range and with a negatively skewed size distribution. When using cyclic voltammetry, it is advisable to use relatively slow scan rates, for example, 10 mV/sec., since such slow scan rates produce a higher density of smaller particles than higher scan rates. Obviously, the maximum potential in the negative direction must be chosen so that the metal ion is reduced to elemental metal. A suitable potential can be selected empirically by observing the rise in the cathodic current in a negative direction. It is also desirable that the potentials used do not become so positive that metal particles are oxidized back to metal ion with consequent redissolution of electrodeposited metal can take place, since such redissolution tends to cause the formation of large, irregular metal particles. For example, an attempt to prepare a glassy carbon/polyvinylacetic acid electrode containing silver particles, using cyclic voltammetry between the extremes of $+800$ mV and $-100$ mV with a scan rate of 10 mV/sec, using the solution described in Example IV below, resulted in the formation of large irregular silver particles. (All potentials quoted herein are, unless otherwise stated, relative to a standard Calomel electrode.) It is believed that the formation of the large irregular particles occurs because the redissolution of electrodeposited metal during the most positive part of the cycle occurs preferentially at the surfaces of the smaller particles (as would be expected on thermodynamic grounds), with consequent disappearance of the smaller particles and redeposition of the dissolved metal on the remains of the larger particles. Similar results occur with palladium if the electrode potential rises to $+1.5$ V. Excessive positive potentials can be avoided by monitoring the anodic current during the potential scan in a positive direction.

When it is desired to produce an instant electrode containing a metal oxide, the corresponding metal may first be electrolytically deposited in the polymer layer in the manner already described and thereafter oxidized to form the appropriate oxide. Any convenient method of oxidation may be employed, although electrochemical methods will tend to be found most convenient.

The instant electrodes display high electrocatalytic activity (including, in some cases, photoelectrocatalytic activity). The instant electrodes are thus useful for catalysis of a variety of redox reactions. For example, as discussed in more detail below, by using a glassy carbon/polyvinylacetic acid electrode of the invention containing platinum metal particles, the overpotential for the discharge of hydrogen from an aqueous solution can be lowered by approximately 600 mV as compared with a bare glassy carbon electrode. Numerous other electrochemical reactions carefully being catalyzed by the instant electrodes will be apparent to those skilled in the art. However, it should be noted that the instant electrodes may not be appropriate for use with electrochemical reactions involving very large ions. For example, it has been found experimentally that use of the aforementioned glassy carbon/polyvinyl acetic acid/platinum metal electrode in cyclic voltammetric electrolysis of $10^{-3}$M ferricyanide in 0.1 M potassium chloride indicates a peak separation greater than that at a pure platinum or a bare glassy carbon electrode, thus indicating that the reaction proceeds irreversibly. Such irreversibility may reflect the limited penetration of the large ferricyanide ion into the polymer layer. However, this limited penetration of large species into the polymeric matrix also appears to be one of the reasons behind the resistance to contamination or "poisoning" of the metal surface of the instant electrodes, and is thus apparently an inevitable concomitant of this resistance to contamination and poisoning.

The following examples are now given, though by way of illustration only, to show details of preferred reagents, conditions and techniques used in the electrodes and methods of the invention.

EXAMPLE I

This example illustrates the production of an instant electrode having a glassy carbon base member and a polymeric layer comprising polyvinylacetic acid and containing platinum metal particles.

Commercially available glassy carbon electrodes (types GC-10, GC-20, or GC-30 manufactured by Tokai Carbon Company, Tokyo, Japan, or V-25 manufactured by Atomergic Chemetals Corporation, New York, N.Y.) were used as the base members. These glassy carbon base members were first polished with 1.0, 0.3 and 0.05 micron alumina (manufactured by Buehler Company, Chicago, Ill.) on an optical flat (manufactured by Harrack Scientific Corporation, Ossining, N.Y.) to a mirror-like finish. Following this alumina polishing, the base members were ultrasonically cleaned in doubly distilled water for at least 15 minutes to remove any residual alumina on the surface and then washed with a stream of doubly distilled water and dried in an oven at 105° C.

Deposition of the polymer layer was effected by immersing the base members in neat vinylacetic acid monomer refluxing at 165° C. under nitrogen for at least 16 hours; the monomer employed was the commercial product obtainable from Aldrich Chemical Company, Milwaukee, Wis. and was used as received without further purification. After deposition of the polymer was complete, the electrodes were subjected to extraction with acetone in a Soxhlet extractor for approximately 24 hours. It should be noted that bulk polyvinylacetic acid is soluble in acetone under the conditions employed for this extraction so that the polyvinylacetic acid film which remained on the base members must be "bound" to the surface in some way. It is believed (although the invention is in no way limited by this belief) that such binding involves interactions of carboxyl groups on the polymer with the underlying glassy carbon, as suggested for other acrylate polymers in Tanaka et al., *J. Polym. Sci.: Polym. Chem. Ed.*, 18, 2267(1980).

The electrochemical deposition of platinum on the polymer-coated glassy carbon electrodes thus prepared was effected using a conventional two-compartment glass cell provided with a potentiostat, using either an omnigraphic 2000 X-Y (manufactured by Houston Instrument Company, Austin, Tx.) or a Linear Strip Chart Recorder (manufactured by Linear Instrument Company, Irvine, Calif.) to record data. All reagents employed were of analytical grade and were used without further purification, while all solutions were prepared with doubly distilled water.

Three different techniques, namely cyclic voltammetry (CV), single potential step electrolysis (SPSE) and double potential step electrolysis (DPSE) were used for electrochemical deposition of the platinum metal. The potential limits for cylic voltammetry were +0.80 and −0.40 V, the scanning rates employed varying from 10 to 50 mV/sec. For single potential step electrolysis, the potential was stepped between +0.80 and 0V, while for double potential step electrolysis the potentials were +0.80 and −0.40 V; in both cases a square wave having a 20 second cycle time was used. When single potential step electrolysis was used, the amount of platinum deposited was calculated from the electrochemical charge consumed, assuming a 100% current efficiency and a four-electron process for the reduction of Pt(IV) to Pt(0). No corresponding calculation could be made for cyclic voltammetry and double potential step electrolysis because of the difficulty of correcting for the charges due to platinum oxide formation and possible redissolution of platinum. Accordingly, with these two electrolysis techniques, the quantity of platinum deposited was controlled by exhaustive electrolysis of a known amount of platinum ion contained in a stirred 1 ml. cell. In all cases, the amount platinum deposited was between 0.2 and 50 micrograms per square centimeter of polymer-covered base member.

The platinum solutions supplied for the elctrochemical deposition comprised from 1 micromole to 1 mM of sodium or potassium hexachloroplatinate (IV) (other alkali metal hexachloroplatinate may alternatively be used) dissolved in 1 M aqueous sulfuric or perchloric acid.

The electrodes thus prepared were examined using either an ISI Model SX-30 scanning electron microscope (manufactured by International Scientific Instruments, Inc., Santa Clara, Calif.) or a Cambridge Stereoscan Model S4-10 scanning electron microscope (manufactured by Cambridge Instruments, Cambridge, England) equipped with Ortec Model 6200 Multichannel Energy Dispersive X-ray Analyzer (manufactured by EG&G, Oak Ridge, Tenn.). The chemical nature of the particles was determined with both the aforementioned X-ray analyzer and with a PHI Model 595 Scanning Auger Microprobe (manufactured by Physical Electronics Instruments, Inc., Eden Prairie, Minn.). Prior to examination with these instruments, the electrodes were washed with a stream of doubly distilled water and air-dried. Particle size distribution was determined from enlarged scanning electron photomicrographs using a Videoplan Computer Imaging System (manufactured by Carl Zeiss, West Germany). The smallest particle diameter that could be imaged was 5 nm. The parameters determined were the distribution function of the particle diameters, as well as the average and standard deviation of the diameters, the apparent surface areas and the particle volumes.

These examinations indicated that the platinum metal particles were substantially spherical though at very high magnifications of 50,000–100,000×, the outer edges of these spheres appear to have angular structures suggesting that the particles might be formed as polycrystalline particles or as coalesced particle clusters. All the particles studied had diameters in the range of 5–300 nm., but the size distribution on any given electrode depended upon the preparation method. Cyclic voltammetry and double potential step electrolysis techniques produced particle size distributions which were Gaussian within experimental error, whereas single step electrolysis produced particles with a distribution curve skewed towards smaller diameters. The particles produced by single potential step electrolysis had larger average diameters, greater standard deviations and lower particle densities than with the other two techniques, and an increase in the hexachloroplatinate concentration with the single potential step electrolysis technique resulted only in an increase in particle size, whereas with the other techniques both the particle size and density increased with hexachloroplatinate concentration. The weight of the dispersed platinum metal calculates from the average diameter and particle density, assuming solid spheres and bulk platinum properties, agreed with the quantity of platinum electrode deposited to within ±20%.

Typical properties of electrodes prepared as described in the example are shown in the table below:

| Method of Preparation | Loading (microg/cm$^2$) | Diameter nm. | Density (Counts/micron$^2$) | Distribution Function |
|---|---|---|---|---|
| CV, 40 mV/s | 9.3 | 64.7 ± 23.2 | 14.7 | Gaussian |
| CV, 40 mV/s | 50.0 | 175.5 ± 46.4 | 12.2 | Gaussian |
| CV, 10 mV/s | 5.5 | 45.2 ± 17.7 | 35.2 | Gaussian |
| CV, 10 mV/s | 11.9 | 37.8 ± 23.0 | 57.9 | Gaussian |
| SPSE | 7.9 | 293.1 ± 80.0 | 0.80 | neg. skewness |
| SPSE | 19.2 | 322.1 ± 67.4 | 1.40 | neg. skewness |
| DPSE | 14.6 | 53.2 ± 9.1 | 74.7 | Gaussian |

EXAMPLE II

This example illustrates the preparation of electrodes similar to those produced in Example I, but containing palladium particles.

Glassy carbon electrodes were cleaned and coated with polyvinylacetic acid in the same was as in Example I. Electrolytic deposition of palladium was then effected by cyclic voltammetry, using limiting potentials of +800 mV and −100 mV with a scanning rate of 10 mV/sec. The electrolysis was conducted using a metal solution containing 0.2 mM of potassium hexachloropalladinate in 1 M molar perchloric acid. The metal loading was about 100 micrograms per square centimeter.

Examination of the resultant electrodes using the same techniques as in Example I indicated that the palladium was dispersed in substantially spherical particles throughout the polymer layer. The results obtained when using the palladium electrodes for the catalysis of hydrogen generation was similar to those for similar platinum-containing electrodes, described in Example VII below, although the palladium electrodes were somewhat less efficient and therefore were not extensively studied.

EXAMPLE III

This example illustrates the production of electrodes containing a palladium/platinum alloy particles.

These electrodes were prepared in substantially the same manner as in Example II, except that the solution used was 0.2 mM in potassium tetrachloroplatinate and 0.2 mM in potassium hexachloroplatinate. The cyclic voltammogram obtained during the electrolysis was a composite of the individual curves for platinum and palladium, indicating that each metal acted independently of the other. Analysis with the energy dispersive X-ray analyzer confirmed that each of the particles analyzed contained a palladium/platinum alloy; thus segregation of the metals into different particles does not occur during the metal deposition.

The palladium/platinum electrodes thus produced were tested for their ability to catalyze hydrogen generation and reduction of oxygen, in the same way as in Example VII below. The electrodes exhibited pronounced catalytic activity, although not quite as good as the pure platinum electrodes tested in Example VII. The properties of the palladium/platinum electrodes are, as might be expected, intermediate those of pure platinum and pure palladium electrodes.

EXAMPLE IV

This example illustrates the preparation of instant electrodes containing silver particles.

Glassy carbon electrodes were cleaned and coated with polyvinylacetic acid in the same way as in Example I above. Electrochemical dispersion of silver metal into the polymer layer was effected using double potential step electrolysis with potentials of +600 mV and −200 mV. The silver solution employed comprised 0.5 mM silver sulfate in 1 M aqueous perchloric acid.

EXAMPLE V

This example illustrates the preparation of instant electrodes containing nickel particles.

Glassy carbon electrodes were cleaned and coated with polyvinylacetic acid in the same way as in Example I above. Dispersion of nickel in the polymer layer was then effected by double potential step electrolysis using potentials of −600 mV and 1.25 V for approximately five minutes and a 20 second cycle. Three different nickel solutions were used, each 1 mM in nickel(II) chloride. The three metal solutions used were a so-called "chloride bath" containing 1 M sodium chloride and 0.5 M boric acid, a "sulfate bath" containing 1 M sodium sulfate and 0.5 M chloric acid, and "Watt's bath" containing 1 M sodium sulfate, 0.15 M sodium chloride and 0.5 M boric acid. All three baths were adjusted to pH 5.5 with 50% aqueous sodium hydroxyde and all gave similar satisfactory results. These nickel deposition baths are patterned after electroplating baths typically used in industrial processes for deposition of nickel. Hydrogen evolution occured during the electrodeposition of nickel, the rate of evolution increasing substantially during the deposition process. Attempts to deposit nickel salts from baths containing 1 M perchloric acid or 0.5 M ammonium acetate were unsuccessful.

Scanning electron microscopy of the nickel electrodes confirmed that, as in the case of the platinum electrodes described in Example I above, the nickel was present in the form of small, substantially spherical particles. This is in marked contrast to the results obtained when nickel is electrodeposited on bare glassy carbon, where nickel tends to deposit along surface defects such as scratches and holes rather than form microparticles.

EXAMPLE VI

This example illustrates the preparation of instant electrodes containing cadmium particles.

Glassy carbon electrodes were cleaned and coated with polyvinylacetic acid in the same way as in Example I above. Dispersion of cadmium particles within the polymer layer was effected by double potential step electrolysis using potential limits of −200 mV and −1.25 V and a 20 second cycle time for approximately two minutes. The metal solution used contained 1 mM of cadmium (II) sulfate, 1 M sodium sulfate and 0.5 M boric acid i.e. the solution was a chloride bath analogous to that used to deposit nickel in Example V above. No attempt was made to deposit cadmium from baths corresponding to the chloride bath or Watt's bath used in Example V. However, cadmium could not be deposited from baths containing 1 M perchloric or 0.5 M ammonium acetate. As with the nickel solutions described in Example V above, hydrogen evolution occurs during the electrodeposition of the cadmium, the rate of evolution increasing substantially during the deposition process.

EXAMPLE VII

This example illustrates the electrocatalytic properties of the instant platinum-containing electrodes prepared in Example I above.

Figure 2:
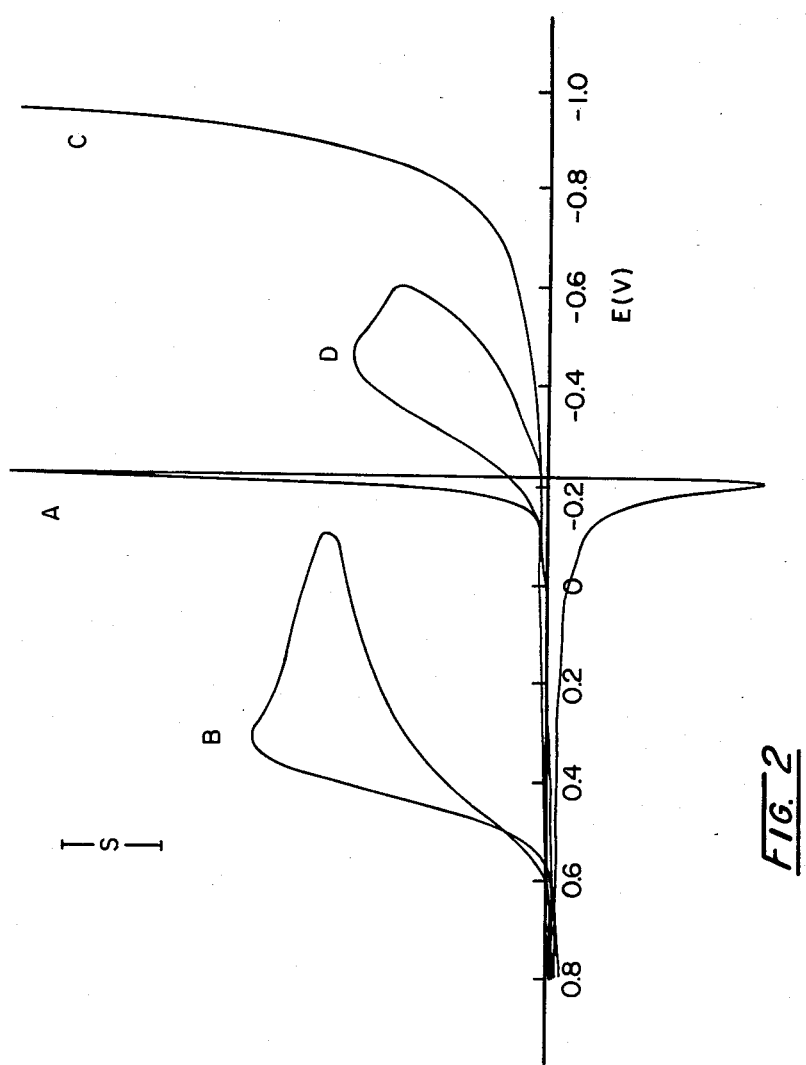
FIG. 2 shows cyclic voltammograms obtained during hydrogen evolution and oxygen reduction using an instant electrode and a prior art electrode.

Platinum-containing electrodes having an electrode area of 0.55 cm.$^2$ and containing 25 micrograms of platinum per square centimeter of polymer layer were tested for their ability to catalyze hydrogen evolution and oxygen reduction during electrolysis of 1 M aqueous sulfuric acid by cyclic voltammetry. Bare glassy carbon electrodes, cleaned in the same manner as described in Example I above but subjected neither to polymer deposition nor metal deposition were tested in exactly the same manner. In both cases, the scan rate was 10 mV./sec. The resultant cyclic voltammograms are shown in FIG. 2, in which A is the current-potential profile for hydrogen generation and trace B that for oxygen reduction at the instant electrode, while traces C and D are respectively those for hydrogen generation and oxygen reduction at the bare glassy carbon electrode; for traces A and C, the distance S represents 200 microamps., while for traces B and D the distance S represents 50 microamps. From FIG. 2 it will be seen that the presence of the polymer/platinum layer reduces the overpotential for hydrogen generation by approximately 600 mV and the hydrogen generated can be reoxidized during the reverse, anodic scan. However, the typical absorption-desorption fine structure of hydrogen at a platinum surface (as discussed in, for example, Stonehart, *Cat. Rev.*, 12, 1, (1975), Conway et al., *Acc. Chem. Res.*, 14, 49 (1981) and the references cited in these two papers) was ill-defined in the hydrogen region at the instant electrode.

Figure 3:
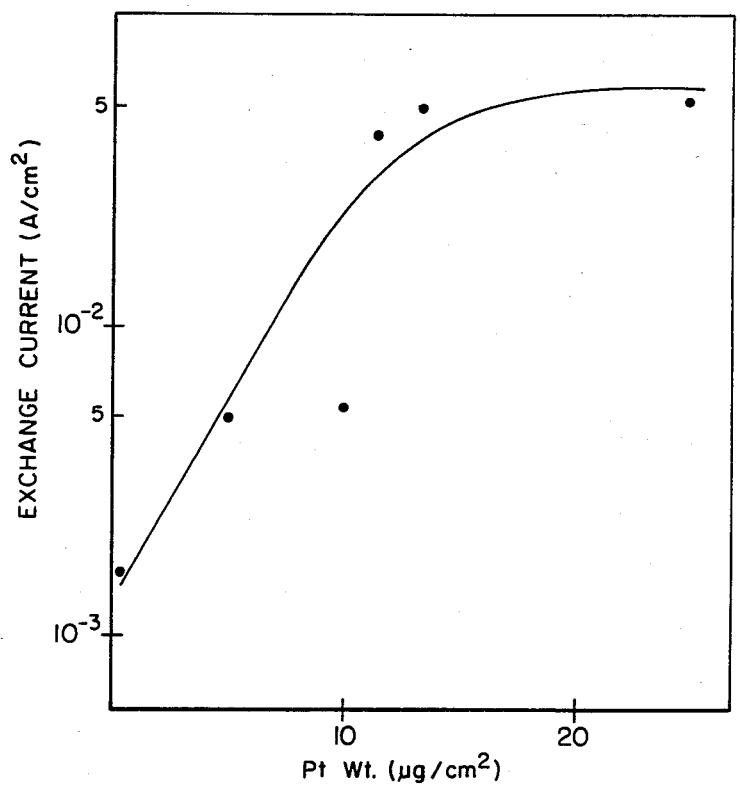
FIG. 3 shows the variation of exchange current for hydrogen generation with metal loading using instant electrodes containing dispersed platinum.

The exchange current for the hydrogen evolution was determined from a Tafel plot; see Bard et al., Electrochemical Methods, Fundamentals and Applications, Wiley, New York, N.Y. (1980). The total surface area of the platinum was calculated from the particle size distribution and number of particles, as measured by scanning electron microscopy, assuming a spherical particle with a smooth surface. When the exchange currents were normalized to their respective areas and plotted as a function of the particle masses, the curve shown in FIG. 3 was obtained. Over the range of 0.1 to 50 micrograms of metal per square centimeter of polymer layer, the exchange current density $I_o$, increased dramatically with an initial increase in particle mass and then reached a maximum value at a loading greater than about 12 micrograms per square centimeter. Note that the $I_o$ values of approximately $10^{-3}$ to $5 \times 10^{-2}$ A/cm.$^2$ for platinum loadings of 0.25 to 25 micrograms per square centimeter are of the same order of magnitude or slightly larger than the literature values of $10^{-4}$ and $10^{-3}$ A/cm$^2$ for smooth platinum in sulfuric acid solution; see Conway, Electrochemical Data, Elsevier, New York, N.Y. (1952) and Bockris et al., Fuel Cells: Their Electrochemistry, McGraw-Hill, New York, N.Y. (1969).

Figure 4:
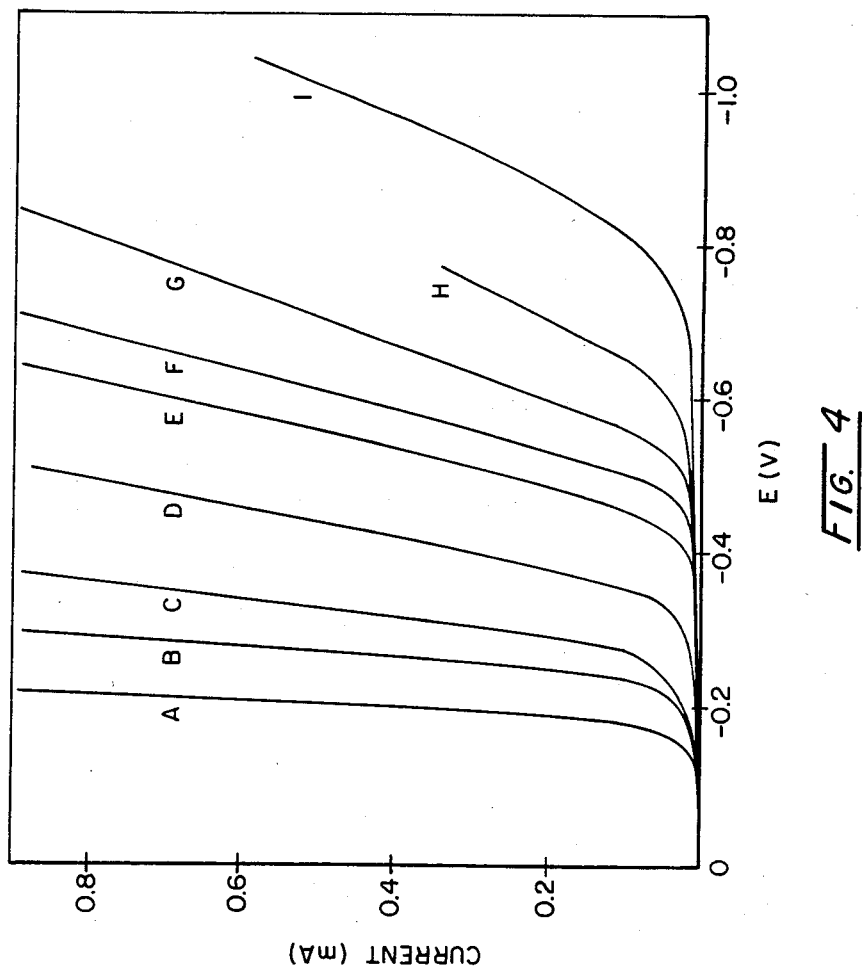
FIG. 4 shows cathodic current-potential curves obtained at various pH values obtained using instant electrodes containing dispersed platinum for hydrogen generation.

FIG. 4 shows the cathodic current-potential curves for hydrogen generation at an instant electrode prepared as described in Example I above and having a platinum loading of 10.5 micrograms per square centimeter of polymer layer, as a function of pH. The pH values for the various curves shown in FIG. 4 are as follows:

|   | pH |
|---|---|
| C | 2 |
| D | 3 |
| E | 4 |
| F | 5 |
| G | 6 |
| H | 7 |
| I | 9 |

In all these cases, the pH was maintained by a 0.1 M phosphate buffer.

Curve A was generated in 1 N aqueous perchloric acid and curve B in 0.1 N aqueous perchloric acid. At each pH value, the cathodic current increases linearly with applied potential beyond the Tafel region. If the linear region of each curve is extrapolated to the potential axis, this "intercept potential" plotted as a function of pH was linear with a slope of $-56$ mV per pH unit. Similar behavior was observed at a smooth platinum electrode.

When the same electrode was used for oxygen reduction, the cyclic voltammetry peak current, $i_p$, increased linearly with the square root of scan rate indicating a mass transfer limited reaction in aqueous sulfuric acid or perchloric acid. The peak current was also linearly dependent on the molecular oxygen concentration at a given scan rate, suggesting that the rate of the electrode reaction depended upon the mass transfer rate of molecular oxygen and not on the proton transfer rate as in the case of hydrogen generation. Both the pH dependence of the peak potential and the calculated exchange current density for molecular oxygen reduction on the electrode were similar to those determined for smooth platinum electrodes.

The stability of the instant electrodes containing platinum metal dispersed in polyvinylacetic acid was tested by generating hydrogen from aqueous sulfuric acid by controlled potential electrolysis at a current density of 20 mA/cm.$^2$ for more than 400 hours. The exchange current density remained unchanged within experimental error over this time, and the mean geometric diameter of the platinum particles, as determined by scanning electron microscopy, also did not change during this period. Thus, the platinum particles remained segregated and activated without evidence of degradation due to particle sintering and recrystallization. The entrainment of the particles in the polymer apparently is effective to prevent aggregation.

The same electrodes were used for cyclic voltammetry of a $10^{-3}$ M ferricyanide in 0.1 M potassium chloride. The peak separation of ferricyanide was less with the instant electrode than with a pure polyvinylacetic acid-coated glassy carbon electrode, but both were greater than that at platinum or bare glassy carbon. The results obtained with the instant electrode were characteristic of an irreversible process compared to that of pure platinum or bare glassy carbon. Such irreversibility may be caused by the limited penetration of larger species into the polymeric matrix as compared with molecular hydrogen and molecular oxygen.

Thus, it will be seen that the instant electrodes possess very desirable electrocatalytic properties. The large metal surface area achieved with low metal loading levels, the high catalytic efficiency and the excellent stability of the dispersed microparticles of metal make the instant electrodes attractive for a variety of redox applications including photocatalysis. The embedding of the metal particles in the polymer layer may also provide a means of preventing the poisoning of platinum and other metals by surfaced adsorbed macromolecules.

It will be apparent to those skilled in the art that numerous changes and modifications can be made in the preferred embodiments of the invention described above without departing from the scope of the invention. Accordingly, the foregoing description is to be construed in an illustrative and not in a limitative sense, the scope of the invention being defined solely by the appended claims.

We claim:

1. A method for producing an electrode, said method comprising:
    immersing a base member formed of conductive material and having at least part of its surface covered with a layer of porous, polymeric material, said porous, polymeric material not itself being capable of effecting reduction or oxidation, in a solution of a metal compound capable of being electrolyzed to deposit said metal; and
    while said base member is still immersed in said solution, passing current through said base member and said solution, thereby causing electrolysis of said metal salt and deposition of a plurality of discrete particles of said metal dispersed in said layer.

2. A method according to claim 1 wherein said base member comprises glassy carbon.

3. A method according to claim 1 wherein said porous polymeric material comprises polyvinylacetic acid.

4. A method according to claim 3 wherein said layer of polyvinylacetic acid is deposited on said base member by immersing said base member in a refluxing solution of vinylacetic acid monomer.

5. A method according to claim 1 wherein said metal comprises platinum and said solution comprises an acid solution of an alkali metal hexachloroplatinate (IV).

6. A method according to claim 1 wherein said metal comprises palladium and said solution comprises an acid solution of an alkali metal hexachloropalladinate (II).

7. A method according to claim 1 wherein said metal comprises silver and said solution comprises an acid solution of silver sulfate.

8. A method according to claim 1 wherein said metal comprises nickel and said solution comprises a solution of nickel chloride and boric acid.

9. A method according to claim 1 wherein said metal comprises cadmium and said solution comprises a solution of cadmium sulfate and boric acid.

10. A method according to claim 1 wherein said electrolysis is effected by cyclic voltammetry.

11. A method according to claim 1 wherein said electrolysis is effected by single or double potential step electrolysis.

12. A method according to claim 1 wherein the total weight of said metal dispersed in said layer by means of said electrolysis is in the range of about 1 to about 50 micrograms per square centimeter of said base member covered by said layer.

13. A method according to claim 1 wherein at least part of said metal deposited by said electrolysis is thereafter oxidized to form an oxide of said metal.

* * * * *